United States Patent [19]

Nakayama et al.

[11] Patent Number: 4,589,747
[45] Date of Patent: May 20, 1986

[54] ELECTRONIC FLASH INCORPORATED CAMERA

[75] Inventors: Yasuhiko Nakayama; Fumio Takami; Masashi Shigeno, all of Nagano, Japan

[73] Assignee: Chinon Kabushiki Kaisha, Japan

[21] Appl. No.: 602,013

[22] Filed: Apr. 19, 1984

[30] Foreign Application Priority Data

Apr. 26, 1983 [JP] Japan .............................. 58-62692[U]

[51] Int. Cl.⁴ ...................... G03B 15/05; G03B 17/04
[52] U.S. Cl. ................. 354/149.11; 354/187; 354/288; 354/289.1
[58] Field of Search ............... 354/145.1, 149.11, 187, 354/288, 289.1

[56] References Cited

U.S. PATENT DOCUMENTS

| | | | |
|---|---|---|---|
| 4,032,940 | 6/1977 | Chan | 354/187 |
| 4,106,037 | 8/1978 | Nakamura et al. | 354/145.1 |
| 4,189,222 | 2/1980 | Maitani | 354/187 |
| 4,299,465 | 11/1981 | Chan | 354/187 |
| 4,500,184 | 2/1985 | Morizumi et al. | 354/149.11 |
| 4,502,768 | 3/1985 | Tsuji et al. | 354/288 |

Primary Examiner—A. A. Mathews
Attorney, Agent, or Firm—Gerald J. Ferguson, Jr.

[57] ABSTRACT

Electronic flash incorporated camera including a camera body having a lens, a case for the camera body, and a lens protective cover slidably mounted on the case. The cover is slidable between a closed position in which the cover covers the lens, and a retracted position in which the lens is exposed. An electronic flash emission member is mounted on the cover, and the emission member is positioned so as to project beyond the contour of the camera case when the cover is in the retracted position.

11 Claims, 3 Drawing Figures

ELECTRONIC FLASH INCORPORATED CAMERA

The present invention relates to an electronic flash incorporated camera having a slide lens protective cover.

BACKGROUND OF THE INVENTION

The use of a so-called "slide cover", as a protective cover (hereinafter referred to as "lens cover") of a photographing or camera lens in a miniature camera, which is slidably mounted on a camera case, is well known. Such a lens cover is capable of protecting the lens without requiring employment of a lens cap which is easily lost or misplaced, and is convenient in that it is easy to use. Also widely used are pop-up electronic flash units adapted to project an electronic flash emission member out of the contour of the camera body on the top of the camera when the electronic flash is used, to enlarge the distance between the camera lens and the electronic flash thereby avoiding the so-called "pink-eye effect".

In prior camera constructions, the conventional lens cover and the pop-up electronic flash are separately mounted on the camera body. Consequently, individual slide mechanisms are required in the camera body to facilitate operation of the lens cover and the electronic flash emission member and this results in rendering the whole structure less compact and increases the weight of the camera. Further, the conventional simple lens cover fails to prevent operation of the camera when the cover is still in position over the lens.

OBJECTS OF THE INVENTION

It is an object of the invention to provide an electronic flash incorporated camera which is designed to be compact and lightweight by integrating the lens cover and the electronic flash emission member.

It is a further object of the invention to provide an electronic flash incorporated camera which is designed so that operation of the camera is prevented when the lens cover is in position over the lens, by indicating such position of the lens cover to the user.

SUMMARY OF THE INVENTION

According to the invention, the electronic flash incorporated camera comprises a case for a camera body having a photographing lens, a lens protective cover mounted on the case, and being freely slidable between a closed position in which the lens protective cover covers the lens, and a retracted position in which the lens is exposed, and an electronic flash emission member mounted on the cover and so positioned as to project out of the contour of the case when the lens protective cover is in the retracted position.

The electronic flash incorporated camera of the invention is designed to have the electronic flash emission member mounted in the lens protective cover to use the same slide mechanism of the lens protective cover, thereby rendering the structure compact and lightweight. The electronic flash incorporated camera is also adapted so that the electronic flash emission member is projected out of the contour of the case when the lens protective cover is in the retracted position to thereby notify the photographer that the lens is not covered by the protective lens cover, and a photograph can be taken.

BRIEF DESCRIPTION OF THE DRAWINGS

The invention will now be described with reference to the accompanying drawings, in which.

DETAILED DESCRIPTION OF THE INVENTION

The present invention will now be described in conjunction with an embodiment shown in the accompanying drawing.

Figure 1:
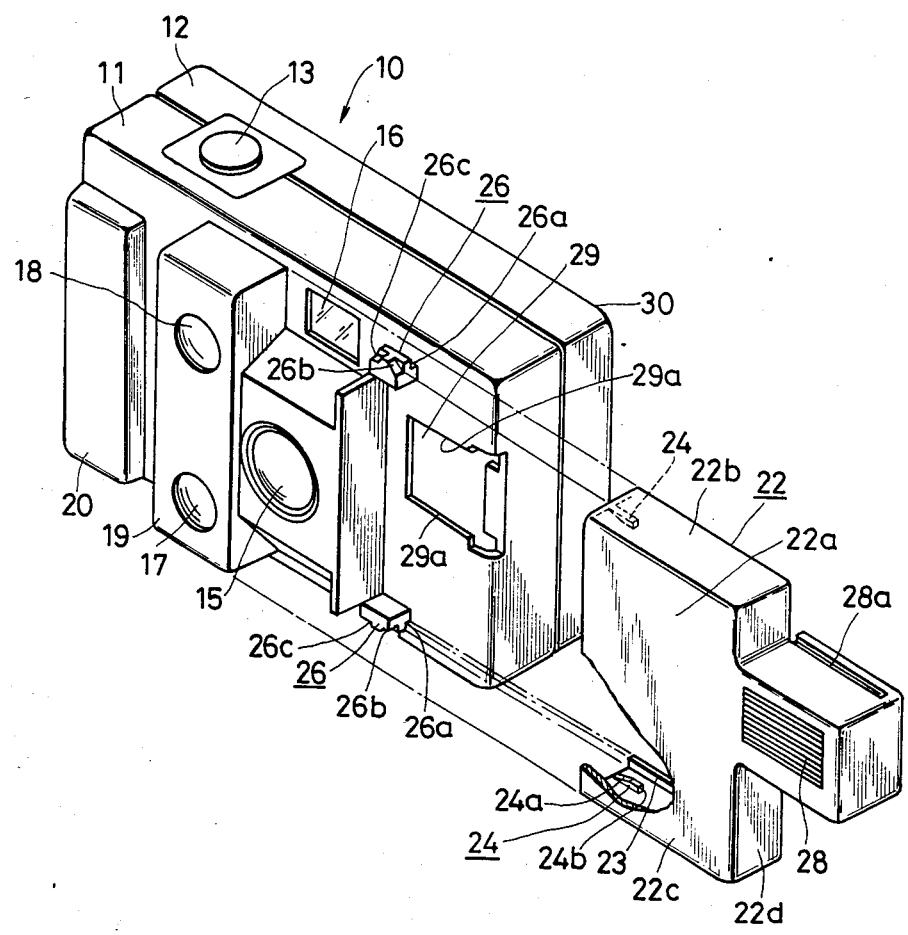
FIG. 1 is an exploded perspective view showing one embodiment of an electronic flash incorporated camera according to the invention.

FIG. 1 shows a camera generally referenced 10 having a front case 11 and a rear case 12, defining a camera housing. The front and rear cases are made of synthetic resin, and are secured by screws to a camera body (not shown) disposed inside the cases. A shutter release button 13 is carried on the tops of the cases. The front case 11 includes a photographing or camera lens 15 centrally of the front surface thereof and a view finder 16 mounted above the lens 15. A distance measuring light beam projector lens 17 is provided together with a reflected light receptive lens 18 for receiving reflected light from the object to be photographed, and these form a well known active AF (auto focus) system. These two lenses 17, 18 are mounted on a front wall 19 of an AF system stored chamber integrally formed to one side of the camera lens 15. A camera driving battery stored chamber is provided having a front wall 20 which is formed by forwardly projecting the front surface on the left end of the front case 11 to maintain a space for storing the battery.

A lens protective cover 22 is provided which consists of a front portion 22a and peripheral walls 22b, 22c, and 22d integrally formed on the three sides except for the left side as shown. Among others, upper and lower periphery walls 22b, 22c are provided in the interior thereof with integrally formed rails 23 extending transversely along the walls 22b, 22c, and lugs 24 are integrally formed with the walls 22b, 22c in parallel with the rails. Each of the lugs 24 is leftwards sloped down to the bottom as shown to provide an inclined surface 24a. Retainers 26 are disposed on the upper and lower front of the front case 11 to engage, respectively, interior surfaces of the upper and lower periphery walls 22b, 22c. Each of the retainers 26 is formed with a notch 26a which is slidably engageable with the rail 23. The retainer 26 is further provided at a portion opposed to the inclined surface 24a of the lug 24 with another inclined surface 26b which is inclined in the same direction as the inclined surface 24a. The retainer includes a stopper 26c leftwards thereof to abut against the right end 24b of the lug 24 as shown, thereby stopping sliding movement of the lens protective cover 22 when it has reached its retracted position.

Figure 2:
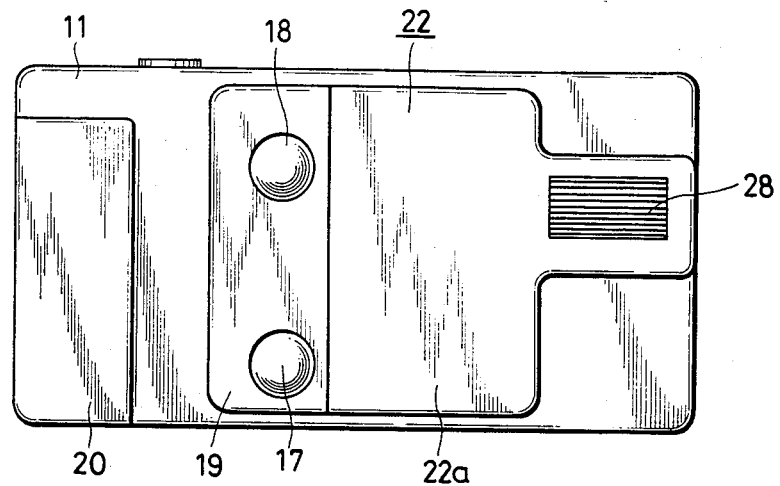
FIGS. 2 and 3 are front elevational views showing a non-photographic condition in which the lens protective cvoer covers the lens, and a photographic condition in which the lens protective cover is in its retracted position, respectively.

The lens protective cover 22 is slidably held by the retainers 26 and freely operated to effect a slidable movement between its first position where the front portion 22a covers the camera lens 15, and its second retracted position where the lens is exposed. As shown in FIG. 2, lens protective cover 22 in its first position abuts against the side of the front wall 19 of the AF system stored chamber. When the lens protective cover is in its retracted position and the camera lens is exposed, the right end 24b of the lug 24 abuts against the stopper 26c.

Figure 3:
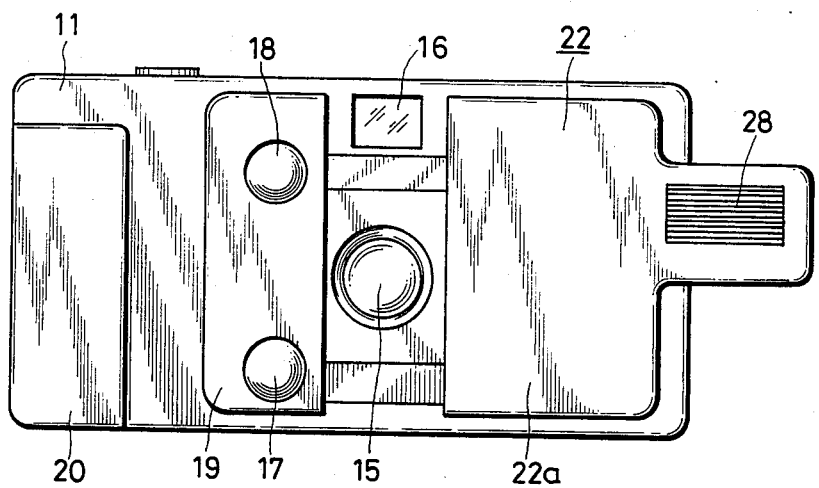

An electronic flash emission member 28 is integrally formed with the periphery wall 22d on the right side of the lens protective cover 22 as shown in FIG. 1. The emission member 28 is so positioned as to project out of the contour of the cases in the retracted position of the protective cover 22 as shown in FIG. 3. The electronic flash member 28 carries at its rear edge grooves 28a (for clarity, only the upper groove 28a is shown) transversely extending as shown in FIG. 1. A guide opening 29 is provided in the front of the front case 11, and to the right of lens 15 as shown. The opening 29 provides upper and lower inner edges 29a which form rails slidably engageable with the grooves 28a.

With the aforementioned arrangement, when the protective cover 22 is mounted, the rails 23 formed on the inner rear surfaces of periphery walls 22b, 22c align with the notches 26a when the protective cover 22 is urged leftwards towards its closed position. Under such operation, the protective cover 22 is slid leftwards, and the inclined surface 24a of each lug 24 is engaged on route with the inclined surface 26b of the retainer 26. However, the inclined surface 24a is able to pass over the inclined surface 26b by elasticity inherent in the protective cover 22. The grooves 28a of the emission member 28 slidably engage with the edges 29a of the opening 29. Ultimately, as shown in FIG. 2 the left side of the lens protective cover 22 abuts against the side of the front wall 19 and the front portion 22a of the protective cover 22 then covers the camera lens 15 to protect the lens.

It is noted that wiring for feeding electricity to the emission member 28 is made between the protective cover 22 and the camera body after the protective cover has been mounted as aforementioned. A main switch 30 for the electronic flash to be used in photographing is disposed in the rear of the camera.

When it is desired to take a photograph, the protective cover 22 is slid rightwards. The protective cover 22 is caused to stop as a result of the right end 24b of the lug 24 abutting against the stopper 26c of the retainer 26. In this stop position, the front portion 22a of the protective cover 22 is displaced with respect to the camera lens 15 to expose the lens, as shown in FIG. 3, and the camera is now ready to take a photograph. Thus, the photographer may determine, depending upon where the emission member is positioned, whether or not a photograph can be taken. This will thus prevent the camera from being operated when the camera lens is covered by the lens protective cover 22.

A photograph may be taken by actuating the electronic flash, if required, after the main switch for the electronic flash is switched on. The emission member 28 is located out the contour of the case 11 as discussed above, and this enables a sufficient distance to be maintained between the emission member and the camera lens 15, thus avoiding the so-called "pink-eye effect".

As will be appreciated from the above, the electronic flash emission member is mounted on the slidable lens protective cover to eliminate the necessity of providing individual slide mechanisms for the respective members as in prior camera arrangments. This renders not only parts having a common sliding mechanism, but also a structure which is lightweight and compact. The invention is also designed so that when the protective cover is slid into a position where it is retracted from the lens, the emission member is projected out the contour of the case. This enables the photographer to readily determine that the lens is exposed and prevents the photographer from trying to take a photograph with the lens covered by the cover.

We claim:

1. An electronic flash incorporated camera, comprising:
    a camera body having a lens;
    a case for said camera body, said case having an external contour;
    a lens protective cover having an electronic flash emission member, said cover being slidably mounted on the front of said case, said cover being slidable between a closed position in which said cover covers said lens, and a retracted position in which said lens is exposed;
    first guide means for guiding said protective cover;
    second guide means for guiding said emission member;
    said emission member being positioned so as to project beyond said external contour of said case when said cover is in said retracted position.

2. A camera as claimed in claim 1, wherein said first guide means guides said protective cover between said closed position and said retracted position.

3. A camera as claimed in claim 2, wherein said first guide means comprises guide rails provided on said protective cover and retainers mounted on said case, said guide rails and said retainers being slidably engageable with respect to each other.

4. A camera as claimed in claim 3, wherein each of said retainers includes a retainer abutment face, and said protective cover includes a corresponding protective cover abutment face, said retainer and protective cover abutment faces being abutingly engageable to stop sliding movement of said protective cover when said protective cover reaches said retracted position.

5. A camera as claimed in claim 4, wherein each said retainer includes an inclined surface extending from said respective abutment faces for facilitating engagement of said protective cover with each said retainer.

6. A camera as claimed in claim 1, wherein said second guide means guides said emission member as said protective cover is moved between said closed and retracted positions.

7. A camera as claimed in claim 6, wherein said second guide means includes guide edges provided in said case and a groove formed in said emission member, said groove and said guide edges being slidably engageable with respect to each other.

8. A camera as claimed in claim 7, wherein said emission member is mounted in a housing formed integrally with said protective cover, said groove being formed in said housing.

9. A camera as claimed in claim 6, wherein an aperture is provided in said case for electrically connecting said emission member to an emission member control switch, said guide edges being defined by said aperture.

10. An electronic flash incorporated camera comprising:
    a camera body having a lens;
    a case for said camera body, said case having an external contour;
    a lens protective cover slidably mounted on the front of said case, and being slidable between a closed position in which said cover covers said lens and a retracted position in which said lens is exposed;

lens protective cover position indicating means mounted on said lens protective cover for indicating whether said protective cover is in said closed or said retracted position, said indicating means comprising an indicating member which is projectable beyond said external contour of said case when said cover is moved to said retracted position, said indicating means including an electronic flash emission member which is movable away from said lens upon movement of said protective cover from said closed position to said retracted position;

first guide means for guiding said protective cover between said closed and retracted positions;

second guide means for guiding said lens protective cover position indicating means when said protective cover is moved between said closed and retracted positions.

11. An electronic flash incorporated camera, comprising:

a camera body having a lens;

a case for said camera body, said case having an external contour;

a lens protective cover slidably mounted on said case and being slidable between a closed position in which said cover covers said lens, and a retracted position in which said lens is exposed, said cover having a lens cover portion and an electronic flash emission member portion having an electronic flash emission member mounted thereto, said electronic flash emission member portion being located within said external contour in said closed position, said electronic flash emission member being slidable in the same direction as said lens cover portion when said lens cover portion moves between said closed and retracted positions, said electronic flash emission member portion projecting beyond said external contour of said case when said cover is in said retracted position.

* * * * *